United States Patent
Boyd et al.

(10) Patent No.: US 9,301,450 B2
(45) Date of Patent: Apr. 5, 2016

(54) COMBINE CROP CONVEYING AND FEEDING SYSTEM

(75) Inventors: Robert Stewart Boyd, Mount Joy, PA (US); Andrew V. Lauwers, Stevens, PA (US); Herb M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/478,735

(22) Filed: May 23, 2012

(65) Prior Publication Data

US 2013/0313077 A1    Nov. 28, 2013

(51) Int. Cl.
    *B65G 23/44*    (2006.01)
    *A01D 61/00*    (2006.01)
    *B65G 19/12*    (2006.01)

(52) U.S. Cl.
    CPC .............. *A01D 61/008* (2013.01); *B65G 19/12* (2013.01); *B65G 23/44* (2013.01)

(58) Field of Classification Search
    CPC ....................................................... B65G 23/44
    USPC ............................................. 198/813, 550.12
    See application file for complete search history.

(56) References Cited

U.S. PATENT DOCUMENTS

| | | | | |
|---|---|---|---|---|
| 3,934,361 A * | 1/1976 | Johnson | .................. | E02F 3/655 198/813 |
| 3,967,719 A * | 7/1976 | Kloefkorn | .............. | A01D 1/008 198/550.12 |
| 4,115,983 A * | 9/1978 | Barnes | ................. | A01D 43/082 56/111 |
| 4,128,952 A | 12/1978 | Duke et al. | | |
| 4,908,002 A | 3/1990 | Tanis | | |
| 5,458,051 A * | 10/1995 | Alden | ..................... | B65G 23/44 198/626.5 |
| 5,632,372 A * | 5/1997 | Steinbuchel | ........... | B65G 23/44 198/813 |
| 5,634,551 A * | 6/1997 | Francioni | ................ | B65B 35/44 198/460.1 |
| 5,720,683 A * | 2/1998 | Patton | ....................... | F16H 7/08 474/109 |
| 5,951,395 A * | 9/1999 | Peter | .................. | A01D 41/1273 460/119 |
| 6,330,782 B1 | 12/2001 | Digman et al. | | |
| 6,745,680 B2 * | 6/2004 | Viaud | ..................... | A01F 15/07 100/8 |
| 6,802,414 B2 * | 10/2004 | Buhne | ..................... | B65G 23/44 198/813 |
| 7,260,967 B2 | 8/2007 | Gryspeerdt | | |
| 7,587,885 B2 * | 9/2009 | Tippery | .................. | A01D 57/20 56/14.5 |
| 7,766,736 B2 | 8/2010 | Ramp et al. | | |
| 2004/0250523 A1 | 12/2004 | Schulz | | |

(Continued)

FOREIGN PATENT DOCUMENTS

| | | |
|---|---|---|
| CA | 2108844 | 2/1997 |
| EP | 1769670 A1 | 4/2007 |
| FR | 2714661 A1 | 7/1995 |

*Primary Examiner* — Gene Crawford
*Assistant Examiner* — Thomas Randazzo
(74) *Attorney, Agent, or Firm* — Patrick M. Sheldrake

(57) ABSTRACT

A combine feeding system includes a lower conveyor roller configured to rotate around a lower conveyor roller axis, an upper conveyor roller configured to rotate around an upper conveyor roller axis and a drive shaft configured to rotate around a drive shaft axis. The lower conveyor roller axis, upper conveyor roller axis and drive shaft axis are substantially perpendicular to first and second housing walls. The feeding system also includes at least one chain configured to move over the drive shaft, the lower conveyor roller and the upper conveyor roller. The feeding system further includes at least one lower support arm coupled to the drive shaft and the lower conveyor roller and configured to pivot about the drive shaft axis. At least one force mechanism is configured to apply a force to the at least one chain in at least one of a first direction and a second direction.

12 Claims, 13 Drawing Sheets

(56) References Cited

U.S. PATENT DOCUMENTS

2007/0251203 A1* 11/2007 Coers .................. A01D 61/02
　　　　　　　　　　　　　　　　　　　　56/181

2013/0059687 A1* 3/2013 Markley ................ F16H 7/0831
　　　　　　　　　　　　　　　　　　　　474/111

* cited by examiner

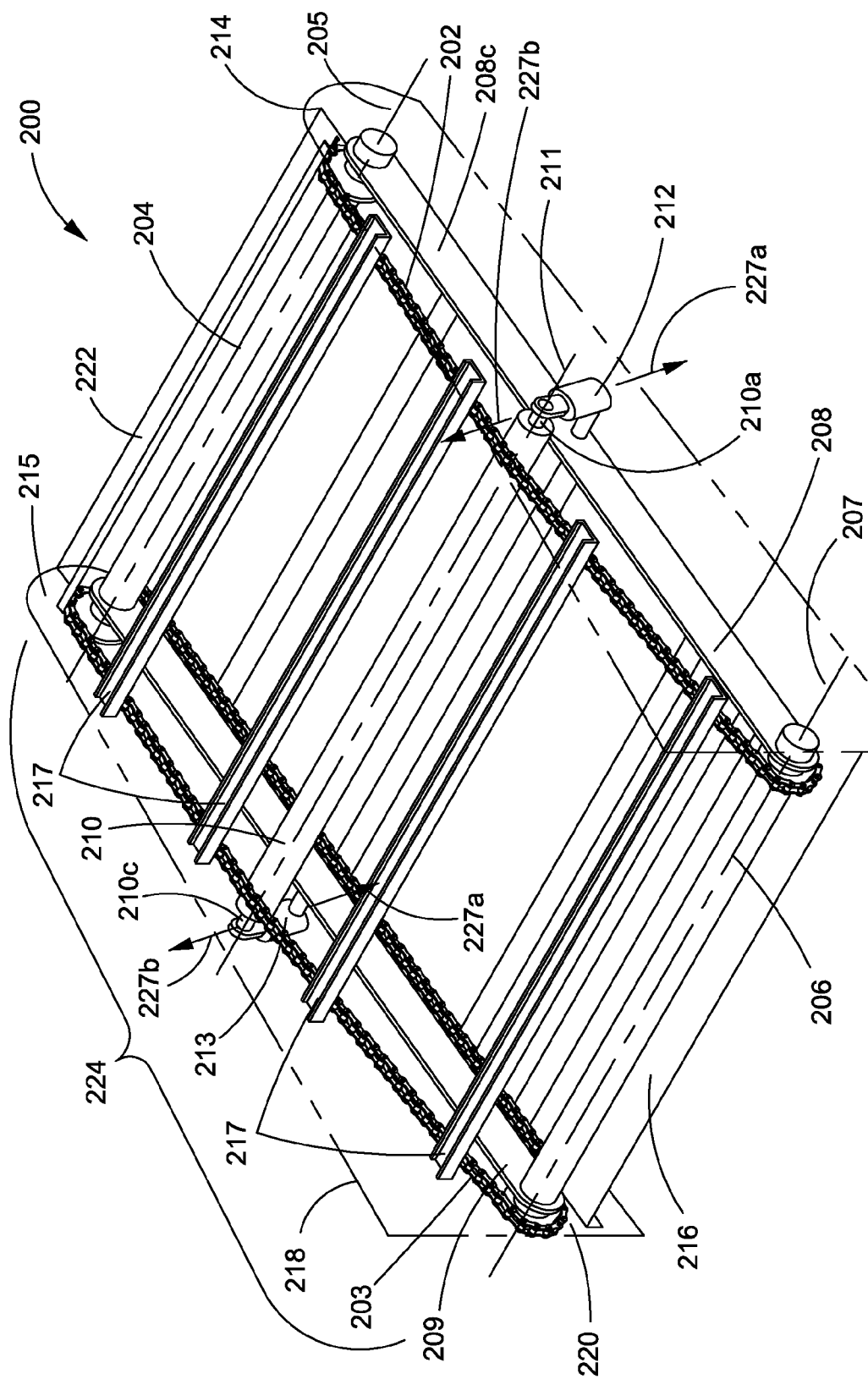

COMBINE CROP CONVEYING AND FEEDING SYSTEM

TECHNOLOGY FIELD

The present invention relates generally to harvesters, such as combine harvesters, and more particularly to an improved combine feeding system, an improved crop conveying system and method for conveying crop material through a combine feeding system.

BACKGROUND

A combine harvester is a machine that is used to harvest grain crops. The objective is to complete several processes, which traditionally were distinct, in one pass of the machine over a particular part of the field. Among the grain crops that may be harvested with a combine are wheat, oats, rye, barley, corn, soybeans, flax or linseed, and others. The waste (e.g., material other than grain (MOG)) discharged on the field includes the remaining dried stems and leaves of the crop which may be, for example, chopped and spread on the field as residue or baled for feed and bedding for livestock.

A combine harvester cuts crop using a wide cutting header. The cut crop is picked up and moved from outer areas of the header toward the center area of the header using an auger or belt system and conveyed to a feeder system. The cut crop is then fed by the feeding system into the threshing and separating mechanism of the combine for separating the grains from the MOG. When the MOG reaches the end of the threshing drum, it is expelled out of the rear of the combine. Meanwhile, the grain, chaff, and other small debris fall through the concaves and grates onto a cleaning device or shoe, where it is further separated from the chaff by way of a winnowing process.

Traditionally, feeder systems have included some type of feeder housing to convey crop from the header to the threshing system while providing support for the header as the combine moves through the field. In many cases, an undershot chain and slat drag (chain assembly) conveyor is employed to convey crop through the feeding system. Due to the packaging constraints of the design, however, the chain assembly is generally made-to-fit rather than being made to function optimally.

For example, conventional feeder systems distance chains in the chain assembly away from the discharge of the header auger to provide adequate clearance between moving elements (e.g. the chain) of the feeding system and the header auger. The chains are typically idled by a drum (conveyor roller) that spans the width of the housing and is supported on the ends. When the chains stretch (tension decreases) due to operational wearing, the chains are tensioned by moving the conveyor roller closer to the header auger, resulting in a smaller space between the conveyor roller closer to the header auger.

The inventors have discovered a number of shortcomings, however, with these conventional approaches. For example, each chain is tensioned the same regardless of its length relative to the others. Due to the natural wearing and elongation of the chain, the chains require regular maintenance and can easily be over tensioned. Conventional approaches address the elongation of the chain by applying a force that is generally in the direction away from the conveyor drive shaft and parallel with the chain, which causes the chain to move closer to the auger. To compensate for the wear on the chain, conventional approaches place a new chain on the conveyor roller that is located further from the header auger to prevent interference between the header auger and the chain as the chain wears and elongates. That is, conventional approaches must place a new chain further away from the header auger so more tension force can be applied as the chain elongates. As a result there is a capacity limitation with large volumes of crop as the pressure tends to relieve itself in the gap between the conveyor roller and the header auger. Further, in many cases the slats cannot be evenly spaced on the chain strand because of the concern for header to feeder clearance and accommodating the wear of the chain, imparting a cyclical load on the conveyor assembly components and reducing their operational life. What is needed is an improved feeding system.

SUMMARY

Embodiments of the present invention are directed to a combine feeding system that includes a feeder housing. The feeder housing includes (i) a first housing wall extending from a front end of the feeder housing to a rear end of the feeder housing and (ii) a second housing wall extending from the front end of the feeder housing to the rear end of the feeder housing. The second housing wall is spaced away from and substantially parallel to the first housing wall. The combine feeding system also includes a drive shaft coupled to at least one of the first housing wall and the second housing wall. The drive shaft extends lengthwise between the first housing wall and the second housing wall proximate to a rear end of the feeder housing and is configured to rotate around a drive shaft axis substantially perpendicular to the first housing wall and the second housing wall. The combine feeding system also includes a lower conveyor roller proximate to the front end of the feeder housing. The lower conveyor roller is coupled to at least one of the first housing wall and the second housing wall. The lower conveyor roller extends lengthwise between the first housing wall and the second housing wall and is configured to rotate around a lower conveyor roller axis substantially perpendicular to the first housing wall and the second wall. The combine feeding system also includes an upper conveyor roller located proximate to the front end of the feeder housing. The upper conveyor roller is coupled to at least one of the first housing wall and the second housing wall, spaced from the lower conveyor roller. The upper conveyor roller extends lengthwise between the first housing wall and the second housing wall and is configured to rotate around an upper conveyor roller axis substantially perpendicular to the first housing wall and the second housing wall. The combine feeding system also includes at least one chain configured to move over the drive shaft, the lower conveyor roller and the upper conveyor roller. The combine feeding system further includes at least one lower support arm coupled to the drive shaft and the lower conveyor roller and configured to pivot about the drive shaft axis and at least one force mechanism configured to apply a force to the at least one chain in at least one of: (i) a first direction and (ii) a second direction substantially opposite the first direction.

According to one embodiment of the invention, the combine feeding system further includes at least one upper support arm coupled to the drive shaft and the upper conveyor roller and configured to pivot about the drive shaft axis. The at least one force mechanism is coupled to at least one of (i) an outer surface of the at least one upper conveyor roller and another outer surface of the at least one lower support arm; and (ii) an outer surface of the at least one upper support arm and an outer surface of the at least one lower support arm.

According to another embodiment of the invention, the at least one lower support arm includes a first lower support arm proximate to the first housing wall and a second lower support arm proximate to the second housing wall and spaced lengthwise from the first lower support arm. The at least one upper support arm includes a first upper support arm proximate to the first housing wall and a second upper support arm proximate to the second housing wall and spaced lengthwise from the first upper support arm. The at least one chain includes a first chain proximate to the first housing wall and configured to move over the drive shaft, the lower conveyor roller and the upper conveyor roller. The at least one chain also includes a second chain proximate to the second housing wall, spaced lengthwise from the first chain and configured to move over the drive shaft, the lower conveyor roller and the upper conveyor roller. The at least one force mechanism includes a first force mechanism configured to apply a first force to (i) the first chain and the first lower support arm in the first direction and (ii) the first chain and the first upper support arm in the second direction substantially opposite the first direction. The at least one force mechanism also includes a second force mechanism configured to apply a second force to (i) the second chain and the second lower support arm in the first direction and (ii) the second chain and the second upper support arm in the second direction substantially opposite the first direction.

According to another embodiment of the invention, the lower conveyor roller, the upper conveyor roller, the at least one lower support arm and the at least one upper support arm together comprise a conveyor assembly which is configured to pivot about the about the drive shaft axis. The at least one upper support arm is configured to independently pivot about the drive shaft axis with respect to the at least one lower support arm.

According to an another embodiment of the invention, when the tension of the at least one chain decreases, the at least one force mechanism is further configured to: (i) move the lower conveyor roller and the upper conveyor roller away from each other; and (ii) control a distance between an outer surface of a header auger and an outer surface of the at least one chain facing the header auger to remain substantially the same.

According to one embodiment of the invention, the at least one upper support arm extends an upper support arm distance from the drive shaft to the upper conveyor roller. The at least one lower support arm extends a lower support arm distance from the drive shaft to the lower conveyor roller. The upper support arm distance and the lower support arm distance are the same.

According to another embodiment of the invention, the at least one lower support arm extends a lower support arm distance from the drive shaft to the lower conveyor roller. The at least one upper support arm extends an upper support arm distance from the drive shaft to the upper conveyor roller. The upper support arm distance is less than the lower support arm distance.

According to one embodiment of the invention, the at least one lower support arm extends a lower support arm distance from the drive shaft to the lower conveyor roller. The at least one upper support arm extends an upper support arm distance from the drive shaft to the upper conveyor roller. The upper support arm distance is greater than the lower support arm distance.

Embodiments of the present invention are directed to a combine crop conveying system that includes a feed assembly, a conveyor assembly and a head assembly. The feed assembly includes a first housing wall extending from a front end of the feeder housing to a rear end of the feeder housing and a second housing wall extending from the front end of the feeder housing to the rear end of the feeder housing. The second housing wall is spaced away from and substantially parallel to the first housing wall. The conveyor assembly includes a drive shaft coupled to at least one of the first housing wall and the second housing wall, extending lengthwise between the first housing wall and the second housing wall proximate to a rear end of the feeder housing and configured to rotate around a drive shaft axis substantially perpendicular to the first housing wall and the second housing wall. The conveyor assembly also includes a lower conveyor roller proximate to the front end of the feeder housing, coupled to at least one of the first housing wall and the second housing wall, extending lengthwise between the first housing wall and the second housing wall and configured to rotate around a lower conveyor roller axis substantially perpendicular to the first housing wall and the second wall. The conveyor assembly also includes an upper conveyor roller located proximate to the front end of the feeder housing, coupled to at least one of the first housing wall and the second housing wall, spaced from the lower conveyor roller, extending lengthwise between the first housing wall and the second housing wall and configured to rotate around an upper conveyor roller axis substantially perpendicular to the first housing wall and the second housing wall. The conveyor assembly also includes at least one chain configured to move over the drive shaft, the lower conveyor roller and the upper conveyor roller and at least one lower support arm coupled to the drive shaft and the lower conveyor roller and configured to pivot about the drive shaft axis. The conveyor assembly further includes at least one force mechanism configured to apply a force to the at least one chain in at least one of: (i) a first direction and (ii) a second direction substantially opposite the first direction. The head assembly includes a header auger having a rear surface and configured for conveying crop material to the conveyor assembly. The rear surface of the header auger is spaced a distance from an front surface of the at least one chain facing the rear surface of the header auger. When the tension of the at least one chain decreases, the at least one force mechanism is further configured to: (i) move the lower conveyor roller and the upper conveyor roller away from each other; and (ii) control the distance between the rear surface of the header auger and the front surface of the at least one chain facing the rear surface of the header auger to remain substantially the same.

According to one embodiment of the invention, the combine crop conveying system further includes at least one upper support arm coupled to the drive shaft and the upper conveyor roller and configured to pivot about the drive shaft axis. The at least one force mechanism is coupled to at least one of (i) a top surface of the at least one lower support arm and a bottom surface of the upper conveyor roller; and (ii) a top surface of the at least one lower support arm and a bottom surface of the upper support arm.

According to another embodiment of the invention, the at least one lower support arm includes a first lower support arm proximate to the first housing wall and a second lower support arm proximate to the second housing wall and spaced lengthwise from the first lower support arm. The at least one force mechanism includes a first force mechanism configured to apply a first force to: (i) the lower conveyor roller and the first lower support arm in the first direction and (ii) the upper conveyor roller in the second direction substantially opposite the first direction. The at least one force mechanism also includes a second force mechanism configured to apply a second force to: (i) the lower conveyor roller and the second lower support arm in the first direction and (ii) the upper conveyor roller in the second direction substantially opposite the first direction. The at least one chain includes a first chain proximate to the first housing wall and configured to move over the drive shaft, the lower conveyor roller and the upper conveyor roller. The at least one chain also includes a second chain proximate to the second housing wall, spaced from the first chain and configured to move over the drive shaft, the lower conveyor roller and the upper conveyor roller.

According to another embodiment of the invention, the conveyor assembly further includes at least one upper support arm coupled to the drive shaft and the upper conveyor roller and configured to pivot about the drive shaft axis. The at least one force mechanism is further configured to apply the force to: (i) the at least one lower support arm in a first direction and (ii) the at least one upper support arm in a second direction substantially opposite the first direction.

According to another embodiment of the invention, the at least one lower support arm includes a first lower support arm proximate to the first housing wall and a second lower support arm proximate to the second housing wall and spaced lengthwise from the first lower support arm. The at least one upper support arm includes a first upper support arm proximate to the first housing wall and a second upper support arm proximate to the second housing wall and spaced lengthwise from the first upper support arm. The at least one chain includes a first chain proximate to the first housing wall and configured to move over the drive shaft, the lower conveyor roller and the upper conveyor roller. The at least one chain also includes a second chain proximate to the second housing wall, spaced lengthwise from the first chain and configured to move over the drive shaft, the lower conveyor roller and the upper conveyor roller. The at least one force mechanism includes a first force mechanism configured to apply a first force to: (i) the first chain and the first lower support arm in the first direction and (ii) the first chain and the first upper support arm in the second direction substantially opposite the first direction. The at least one force mechanism also includes a second force mechanism configured to apply a second force to: (i) the second chain and the second lower support arm in the first direction and (ii) the second chain and the second upper support arm in the second direction substantially opposite the first direction.

According to another embodiment of the invention, the lower conveyor roller, the upper conveyor roller, the at least one lower support arm and the at least one upper support arm together comprise a conveyor assembly which is configured to pivot about the about the drive shaft axis. The at least one lower support arm is configured to independently pivot about the drive shaft axis with respect to the at least one upper support arm.

According to one embodiment of the invention, the at least one upper support arm extends an upper support arm distance from the drive shaft to the upper conveyor roller. The at least one lower support arm extends a lower support arm distance from the drive shaft to the lower conveyor roller. The upper support arm distance and the lower support arm distance are the same.

According to another embodiment of the invention, the at least one lower support arm extends a lower support arm distance from the drive shaft to the lower conveyor roller. The at least one upper support arm extends an upper support arm distance from the drive shaft to the upper conveyor roller. The upper support arm distance is different from the lower support arm distance.

Embodiments of the present invention are directed to a method for conveying crop material through a combine feeding system. The method includes conveying crop material, via a conveyor assembly, through a feeding system. The crop material is conveyed by driving a drive shaft coupled to a feeder housing and proximate to a rear end of the feeder housing, causing the drive shaft to rotate about a drive shaft axis and rotating a lower conveyor roller coupled to the feeder housing and proximate to a front end of the feeder housing about a lower conveyor roller axis. The crop material is also conveyed by rotating an upper conveyor roller spaced from the lower conveyor roller and located above the lower conveyor roller about an upper conveyor roller axis and moving at least one chain over the drive shaft, the lower conveyor roller and the upper conveyor roller. The crop material is further conveyed by pivoting at least one lower support arm coupled to the drive shaft and the lower conveyor roller about the drive shaft axis. The method also includes applying a force, by a force mechanism, to (i) the at least one chain in a first direction and (ii) the at least one chain in a second direction substantially opposite the first direction. The method further includes tensioning the at least one chain with the force to maintain a tension on the at least one chain.

According to one embodiment of the invention, the method further includes conveying the crop material, by a header auger, to the feeding system and controlling a distance between a rear surface of the header auger and a front surface of the at least one chain facing the header auger to remain substantially the same.

According to another embodiment of the invention, the method further includes pivoting at least one upper support arm coupled to the drive shaft and the upper conveyor roller about the drive shaft axis. Applying a force includes applying the force to (i) the at least one lower support arm in a first direction and (ii) the at least one upper support arm in a second direction substantially opposite the first direction.

According to another embodiment of the invention, applying a force includes moving the lower conveyor roller further away from the upper conveyor roller when a tension of the chain decreases.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 2A is a perspective view of the exemplary feeding system shown at FIG. 2 for use with embodiments of the present invention;

DETAILED DESCRIPTION OF ILLUSTRATED EMBODIMENTS

Embodiments of the present invention provide an improved feeding system which applies a force to (i) automatically tension at least one chain moving over conveyor rollers and a drive shaft when the tension decreases and (ii) control a distance between a header auger and the at least one chain to remain substantially the same when the at least one chain is tensioned. The present invention is directed to embodiments of a combine feeding system, a combine crop conveying system and a method for conveying crop material through a combine feeding system. Embodiments of the present invention utilize at least one force mechanism configured to apply the force to (i) a lower conveyor roller and at least one lower support arm in a first direction and (ii) an upper conveyor roller and at least one upper support arm in a second direction substantially opposite the first direction when the at least one chain is tensioned.

Figure 1:
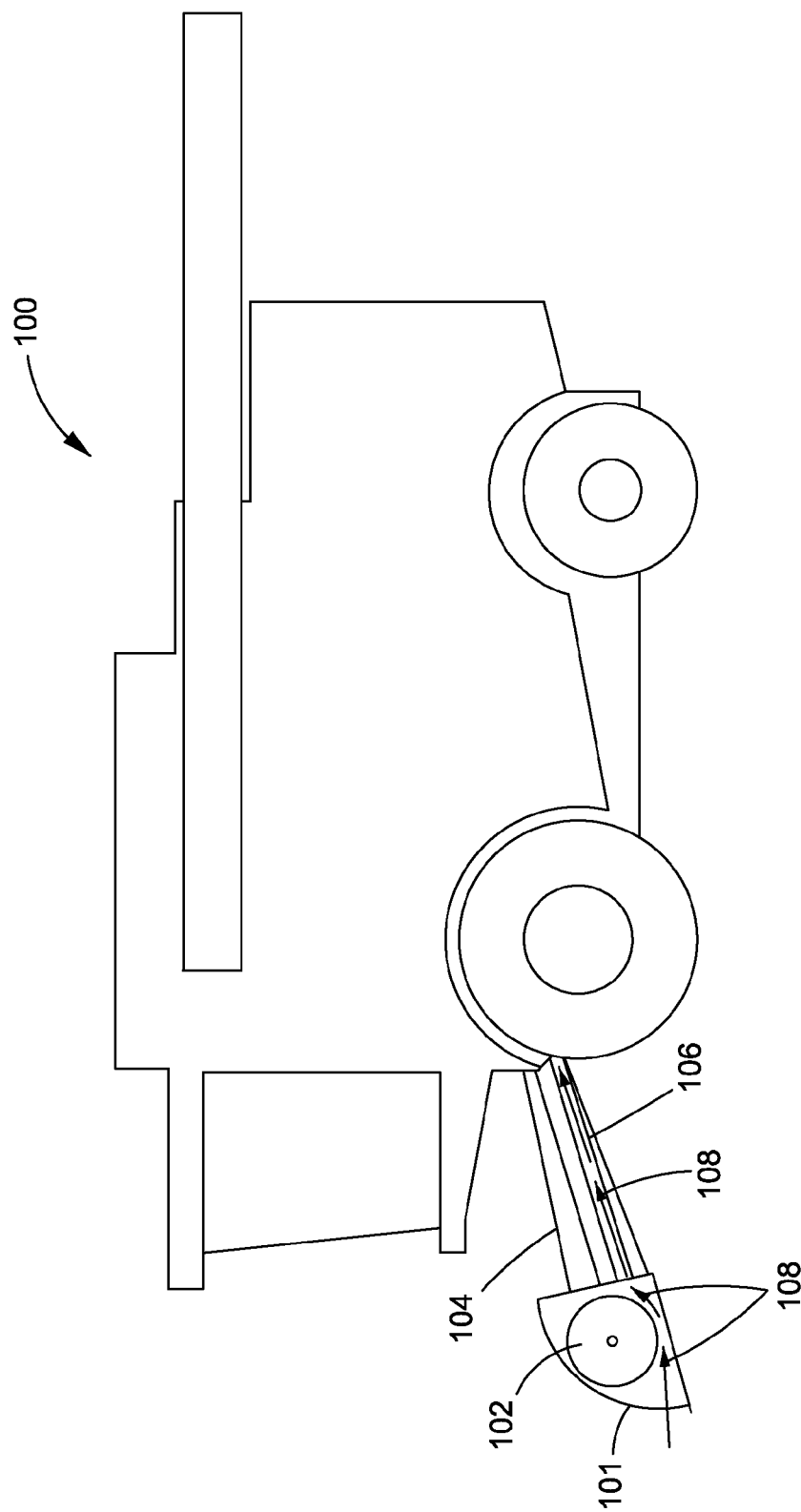
FIG. 1 is a side view of an exemplary harvester for use with embodiments of the present invention.

FIG. 1 shows an exemplary agricultural combine 100. As shown in FIG. 1, combine 100 includes a header 101 and a feeding system 104. Header 101 cuts crop and conveys the cut crop material to a center of the header 101 using header auger 102. A belt system (not shown) may also be used to convey the cut crop material to a center of the header 101. Header auger 102 conveys the crop material to feeding system 104 and the feeding system 104 continues the crop flow along the path 106 in a direction shown by arrows 108. Feeding system 104 conveys the crop material to a threshing and separating system (not shown) within the combine 100.

Figure 2:
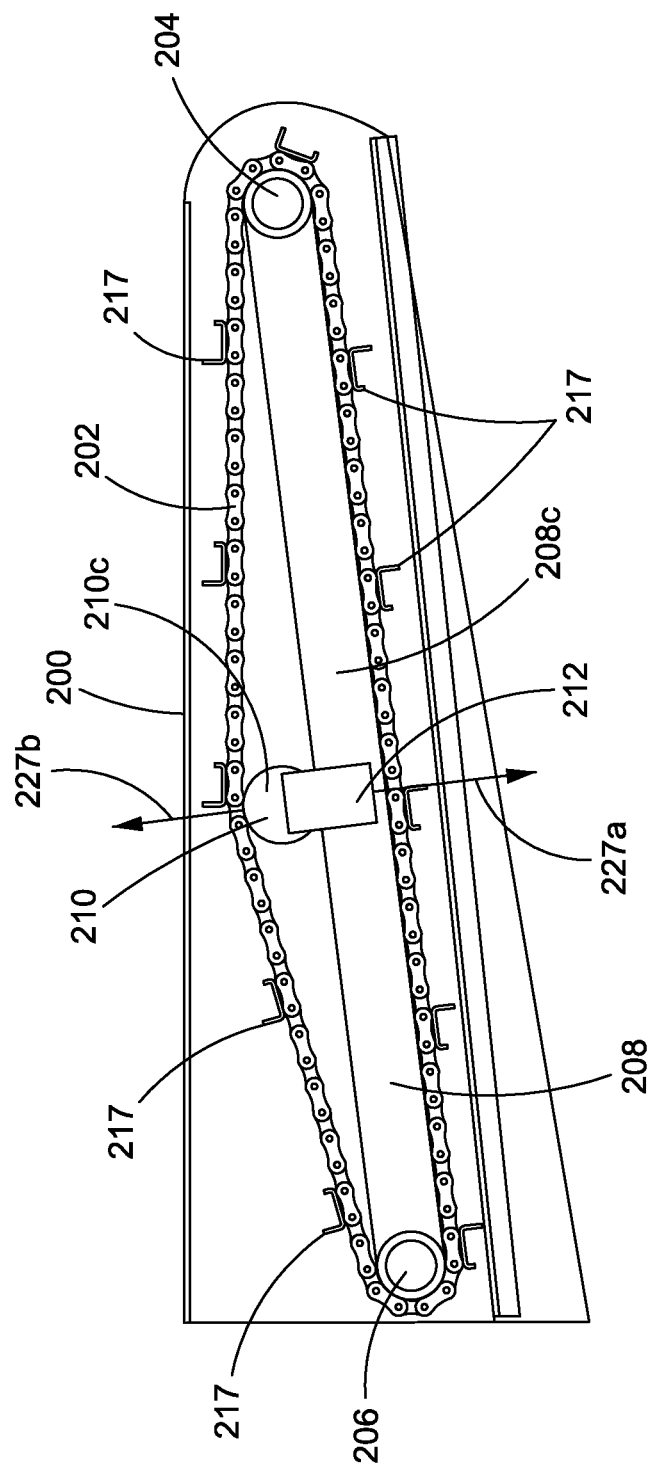
FIG. 2 is a side view of an exemplary feeding system illustrating a chain configured to move over a drive shaft, a lower conveyor roller coupled to a lower support arm and an upper conveyor roller for use with embodiments of the present invention.

FIG. 2 is a side view of an exemplary feeding system 200 illustrating a chain 202 configured to move over a drive shaft 204, a lower conveyor roller 206 coupled to a lower support arm 208 and an upper conveyor roller 210 for use with embodiments of the present invention. FIG. 2A is a perspective view of the exemplary feeding system 200 shown at FIG. 2 for use with embodiments of the present invention. As shown at FIG. 2A, feeding system 200 includes a feeder housing 218. Feeder housing 218 includes a first housing wall 214 extending from a front end 220 of the feeder housing to a rear end 222 of the feeder housing 218 and a second housing wall 215 extending from the front end 220 of the feeder housing 218 to the rear end 222 of the feeder housing 218. The second housing wall 215 is spaced away from and substantially parallel to the first housing wall 214.

According to some embodiments, feeder system 200 includes a conveyor assembly 224. Conveyor assembly 224 includes a drive shaft 204, configured for driving flexible members, such as chains 202 and 203. Drive shaft 204 may be coupled to at least one of the first housing wall 214 and the second housing wall 215. Drive shaft 204 extends lengthwise between the first housing wall 214 and the second housing wall 215 and is proximate to a rear end 222 of the feeder housing 218. Drive shaft 204 is configured to rotate around a drive shaft axis 205 substantially perpendicular to the first housing wall 214 and the second housing wall 215. Drive shaft 204 is configured for driving the chains 202 and 203.

In some embodiments, as shown for example at FIG. 2 and FIG. 2A, conveyor assembly 224 may include: a lower conveyor roller 206, an upper conveyor roller 210, a plurality of chains, such as first chain 202 and second chain 203; a plurality of lower support arms, such as first lower support arm 208 and second lower support arm 209; and a plurality of force mechanisms, such as first force mechanism 212 and second force mechanism 213. In other embodiments, an exemplary conveyor assembly may include a single chain, a single lower support arm, and a single force mechanism. In other embodiments, an exemplary conveyor assembly may include more than two chains, more than two lower support arms, and more than two force mechanisms.

Referring to FIG. 2A, lower conveyor roller 206 may be located proximate to the front end 220 of the feeder housing 218 and is coupled to at least one of the first housing wall 214 and the second housing wall 215. Lower conveyor roller 206 extends lengthwise between the first housing wall 214 and the second housing wall 215 and is configured to rotate around a lower conveyor roller axis 207 substantially perpendicular to the first housing wall 214 and the second wall 215. Upper conveyor roller 210 is located proximate to the front end 220 of the feeder housing 218 and is coupled to at least one of the first housing wall 214 and the second housing wall 215. Upper conveyor roller 210 is spaced from the lower conveyor roller 206 and extends lengthwise between the first housing wall 214 and the second housing wall 215. Upper conveyor roller 210 is configured to rotate around an upper conveyor roller axis 211 substantially perpendicular to the first housing wall 214 and the second housing wall 215.

Chains 202, 203 may be configured to move over the drive shaft 204, the lower conveyor roller 206 and the upper conveyor roller 210. For example, as shown at FIG. 2A, conveyor assembly 224 includes first chain 202 proximate to the first housing wall configured to move over the drive shaft 204, the lower conveyor roller 206 and the upper conveyor roller 210. Conveyor assembly 224 also includes second chain 203 proximate to second housing wall, spaced from the first chain 202 and configured to move over the drive shaft 204, the lower conveyor roller 206 and the upper conveyor roller 210. Drive shaft 204, the lower conveyor roller 206 and the upper conveyor roller 210 may include sprockets (not shown) and the chains 202, 203 may move along parallel paths over the sprockets. The chains may be driven by sprockets (not shown) on the drive shaft 204. Conveyor assembly 224 may also include a plurality of generally transverse slats 217 mounted across and to the chains 202, 203 for conveying crop material through the feeder housing 218 between the conveyor assembly 224 and a bottom portion 216 of the feeder housing 218.

As shown at FIG. 2A, first lower support arm 208 may be proximate to the first housing wall 214, coupled to the drive shaft 204 and the lower conveyor roller 206 and configured to pivot about the drive shaft axis 205. Second lower support arm 209 may be proximate to the second housing wall 215 and also coupled to the drive shaft 204 and the first conveyor roller 206. The second lower support arm 209 may be spaced lengthwise from the first lower support arm 208 and also configured to pivot about the drive shaft axis 205.

Force mechanisms 212 and 213 may be configured to apply a force to (i) chains 202 and 203 in a first direction 227a and (ii) chains 202 and 203 in a second direction 227b substantially opposite the first direction 227a. For example, as shown at FIG. 2A, first force mechanism 212 may be configured to apply a first force to first chain 202 in the first direction 227a and the second direction 227b substantially opposite the first direction 227a. That is, first force mechanism 212 may apply the first force to first chain 202 by applying the first force to the first lower support arm 208 in the first direction 227a. First force mechanism 212 may also apply the first force to first chain 202 by applying the first force to the upper conveyor roller 210 in the second direction 227b. Second force mechanism 213 may be configured to apply a second force to second chain 203 in the first direction 227a and the second direction 227b substantially opposite the first direction 227a. That is, second force mechanism 213 may apply the second force to second chain 203 by applying the second force to the second lower support arm 209 in the first direction 227a. Second force mechanism 213 may also apply the second force to second chain 203 by applying the second force to the upper conveyor roller 210 in the second direction 227b.

Figure 3:
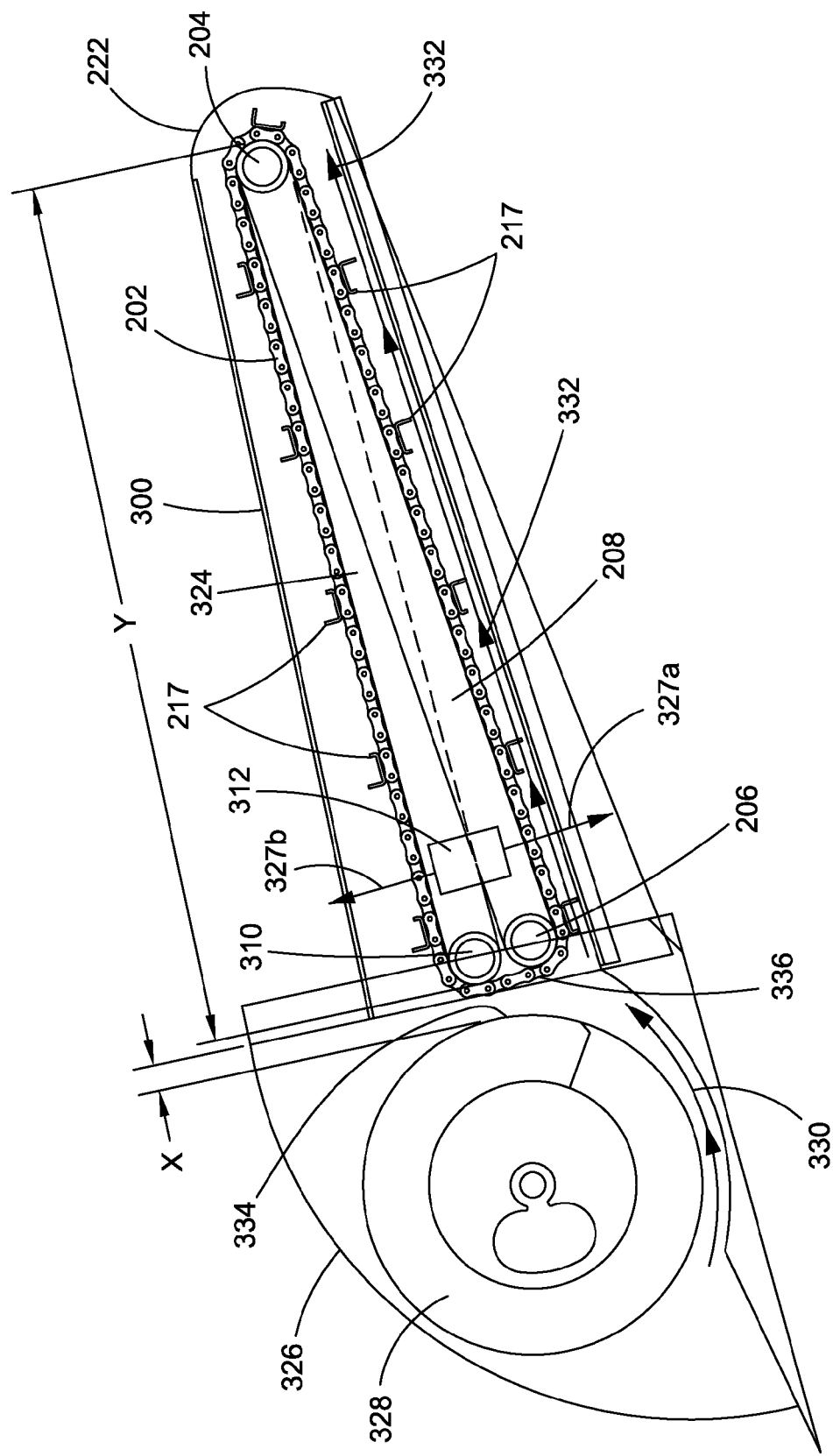
FIG. 3 is a side view of an exemplary crop conveying system illustrating a header adjacent a feeding system having a conveyor assembly with an upper support arm and a lower support arm for use with embodiments of the present invention.

Although force mechanism 212 and 213 shown in FIG. 3 illustrate forces applied in a first direction 227a and a second direction 227b, an exemplary force mechanism may be configured to apply a force in a single direction. For example, first force mechanism 212 may be configured to apply a force to first chain 202 in the second direction 227b without applying the force in the first direction 227a. Further, second force mechanism 213 may be configured to apply a force to second chain 203 in the second direction 227b without applying the force in the first direction 227a.

Exemplary force mechanisms may be configured to apply forces continuously. In some embodiments, the forces may be continuously applied during operation of the feeding system. For example, a force mechanism, such as a hydraulic cylinder, may be configured to apply continuous forces when the conveyor assembly is turned on. The forces, which may be applied in substantially opposite directions, may tension the first and second chains 202 and 203 when their respective tensions decrease. Accordingly, the first and second chains 202 and 203 may be automatically tensioned, alleviating the need for manual tensioning. Embodiments of the present invention describe a force representing a total force produced by a sum of the forces in opposite directions. It is contemplated, however, that each directional force may be expressed individually as its own separate force. Forces applied in one direction may be equal to or different from the forces applied in substantially opposite directions.

The embodiment illustrated at FIG. 2A shows chains, support arms and force mechanisms located near opposite ends of the conveyor rollers and the drive shaft. It is contemplated, however, that chains, support arms and force mechanisms may be located at positions different from those shown at FIG. 2A. It is also contemplated that any number of chains, support arms and force mechanisms may used in a conveyor assembly.

Figure 3A:
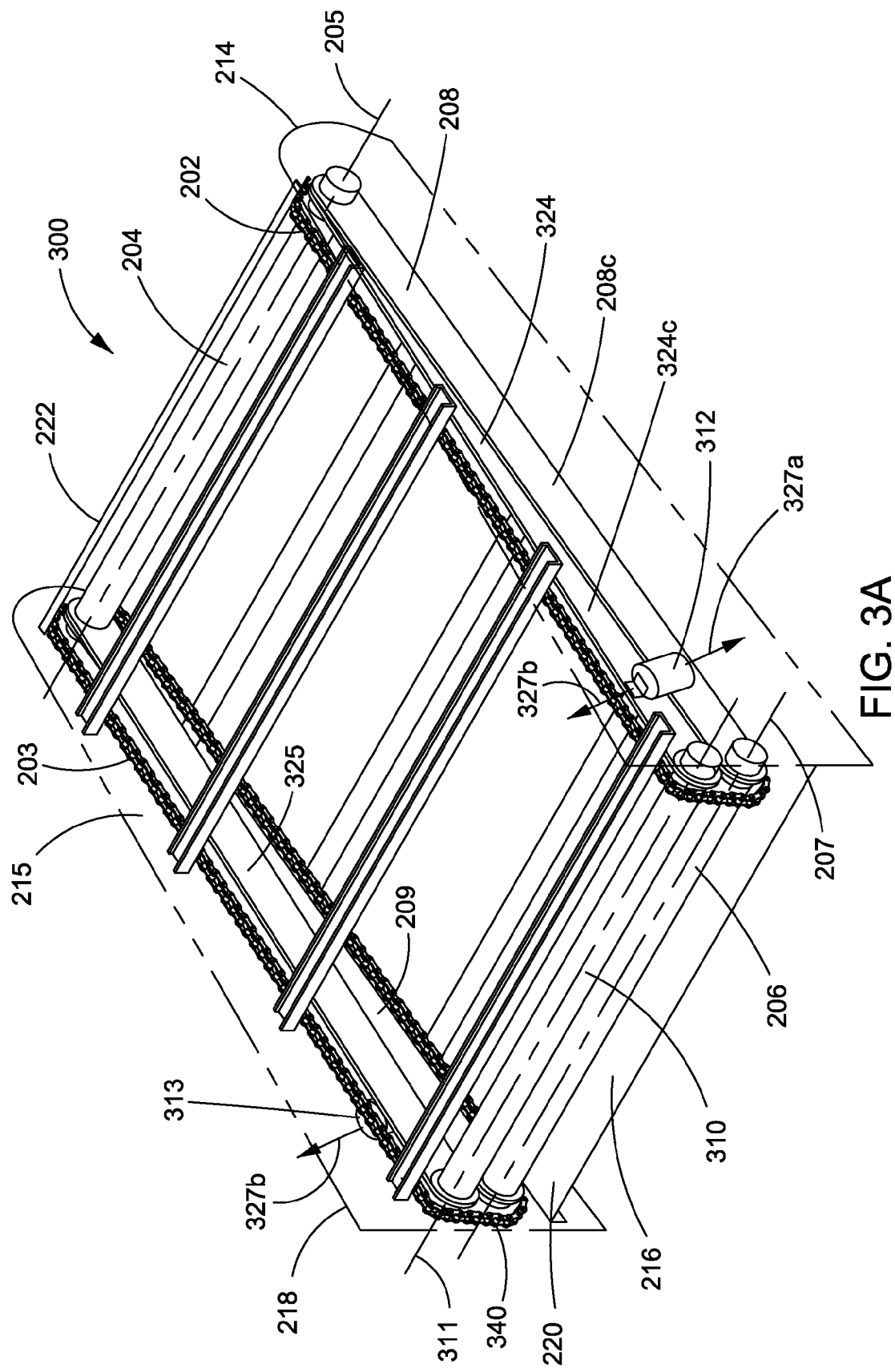
FIG. 3A is a perspective view of the feeding system shown in FIG. 3 for use with embodiments of the present invention.

According to some embodiments, as shown for example at FIG. 3 and FIG. 3A, a feeding system 300 may also include a plurality of upper support arms 324, 325. For example, force mechanisms 312, 313 may be coupled to upper support arms 324, 325 and lower support arms 208, 209. In other embodiments, an exemplary conveyor assembly may include a single upper support arm, a single lower support arm and a single force mechanism coupled to the upper support arm and lower support arm. In other embodiments, an exemplary conveyor assembly may include more than two upper support arms, more than two lower support arms and more than two force mechanisms coupled to corresponding upper support arms and lower support arms.

As shown at FIG. 3 and FIG. 3A, first lower support arm 208 may be coupled to lower conveyor roller 206 and drive shaft 204 and first upper support arm 324 may be coupled to upper conveyor roller 310 and drive shaft. Feeding system 300 also includes force mechanism 312 coupled to the at least one upper support arm 324 and the at least one lower support arm 208. Force mechanism 312 may be configured to apply a force to: (i) the lower support arm 208 in a first direction 327a and (ii) the at least one upper support arm 324 in a second direction 327b substantially opposite the first direction 327a. Accordingly, force mechanism 312 may apply the force to chain 202 by applying the force to the lower support arm 208 in the first direction 327a. Force mechanism 312 may also apply the force to chain 202 by applying the force to the upper support arm 324 in the second direction 327b. The force, applied in substantially opposite directions, automatically tensions the chain 202 when the tension decreases.

FIG. 3A is a perspective view of the exemplary feeding system 300 shown at FIG. 3 for use with embodiments of the present invention. As shown at FIG. 3A, first lower support arm 208 may be proximate to the first housing wall 214 and a second lower support arm 209 may be proximate to the second housing wall 215. Second lower support arm 209 is spaced lengthwise from the first lower support arm 208. Feeding system 300 also includes a first upper support arm 324 proximate to the first housing wall 214 and a second upper support arm 325 proximate to the second housing wall 215. Second upper support arm 325 is spaced lengthwise from the first upper support arm 324.

Feeding system 300 also includes a first chain 202 proximate to the first housing wall 214 and a second chain 203 proximate to the second housing wall 215. Chains 202 and 203 may be configured to move over the drive shaft 204, the lower conveyor roller 206 and the upper conveyor roller 310. Chain 203 may be spaced lengthwise from the first chain 202.

Feeding system 300 further includes a first force mechanism 312 and a second force mechanism 313. First force mechanism 312 may be configured to apply a first force to (i) the first chain 202 and the first lower support arm 208 in the first direction 327a and (ii) the first chain 202 and the first upper support arm 324 in the second direction 327b substantially opposite the first direction 327a. Second force mechanism 313 may be configured to apply a second force to (i) the second chain 203 and the second lower support arm 209 in the first direction 327a and (ii) the second chain 203 and the second upper support arm 325 in the second direction 327b substantially opposite the first direction 327a. The forces, applied in substantially opposite directions, may tension the first and second chains 202 and 203 when their respective tensions decrease. Accordingly, the first and second chains 202 and 203 may be automatically tensioned, alleviating the need for manual tensioning.

The exemplary crop conveying system shown at FIG. 3 illustrates a head assembly 326 adjacent a feeding system 300 and located proximate to the front end 220 of the feeder housing 300. As shown at FIG. 3, head assembly 326 includes a header auger 328 configured for conveying crop material to the feeding system 300 along the path 330 in a direction shown by arrows 332. Header auger includes an outer surface 334 spaced a distance x from an outer surface 336 of the first chain 202 facing the outer surface 334 of the header auger 328. Outer surface 334 of header auger 328 may also be spaced the distance x from another outer surface 340 of the second chain 203 facing the outer surface 334 of the header auger 328. It is also contemplated that the outer surface 334 of header auger 328 may also be spaced the distance x from outer surfaces of any number of chains facing the outer surface 334 of the header auger 328. When the tension of the chain 202 decreases, force mechanism 312 applies the force to the lower support arm 208 in the first direction 327a and the upper support arm 324 in the second direction 327b, thereby moving the lower conveyor roller 206 and the upper conveyor roller 310 away from each other and tensioning the chain 202. Force mechanism 312 also controls distance x between outer surface 334 of the header auger 328 and an outer surface 336 of the chain 202 facing the header auger 328 to remain substantially the same. That is, the at least one chain 202, 203 may be tensioned when their respective tensions decrease and while the distance x is controlled to remain substantially the same.

From the side view shown at FIG. 3, during operation, the header auger 328, drive shaft 204 and conveyor rollers 206 and 210 rotate counter clockwise (CCW) causing the slats 217 to engage and convey the crop material delivered by the header auger 328 along the path 330 in a direction shown by arrows 332.

Figure 2B:
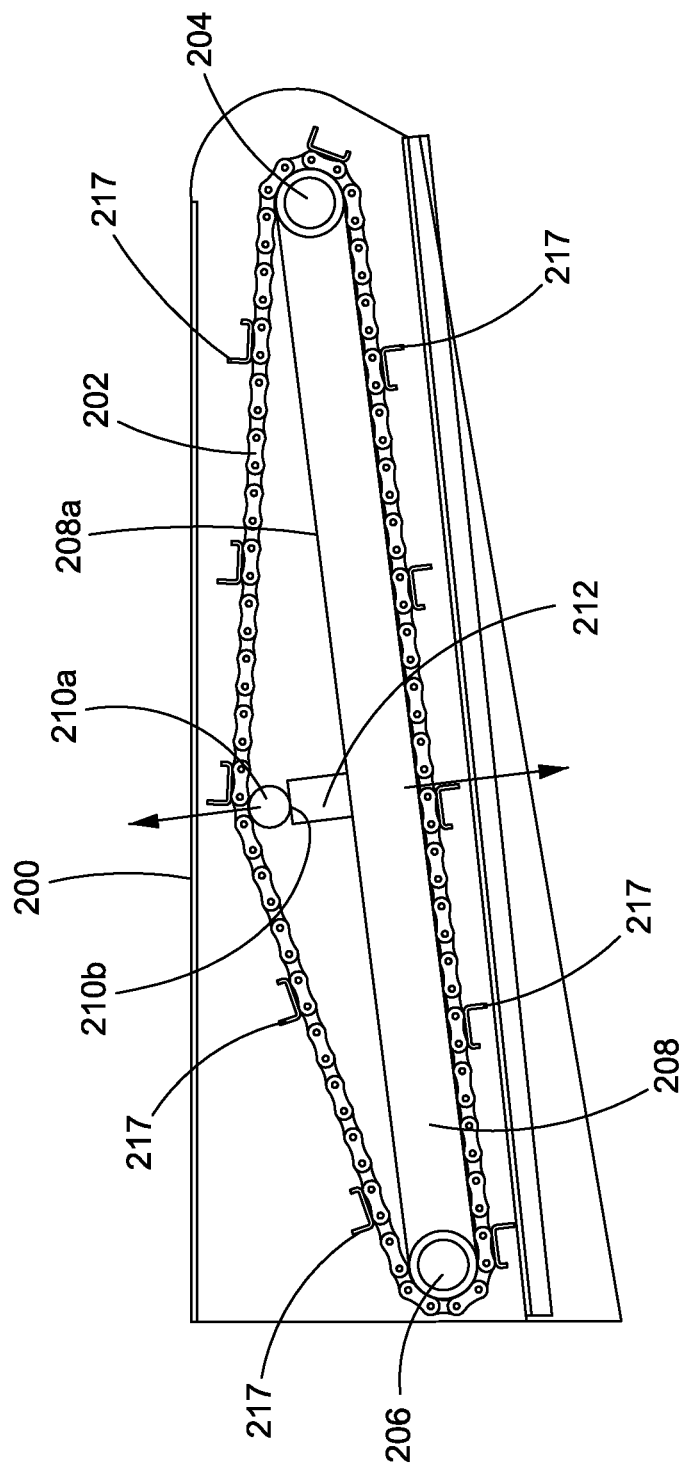
FIG. 2B is a side view of a feeding system illustrating a force mechanism positioned in-line with an upper conveyor roller and a lower support arm for use with embodiments of the present invention.
Figure 3B:
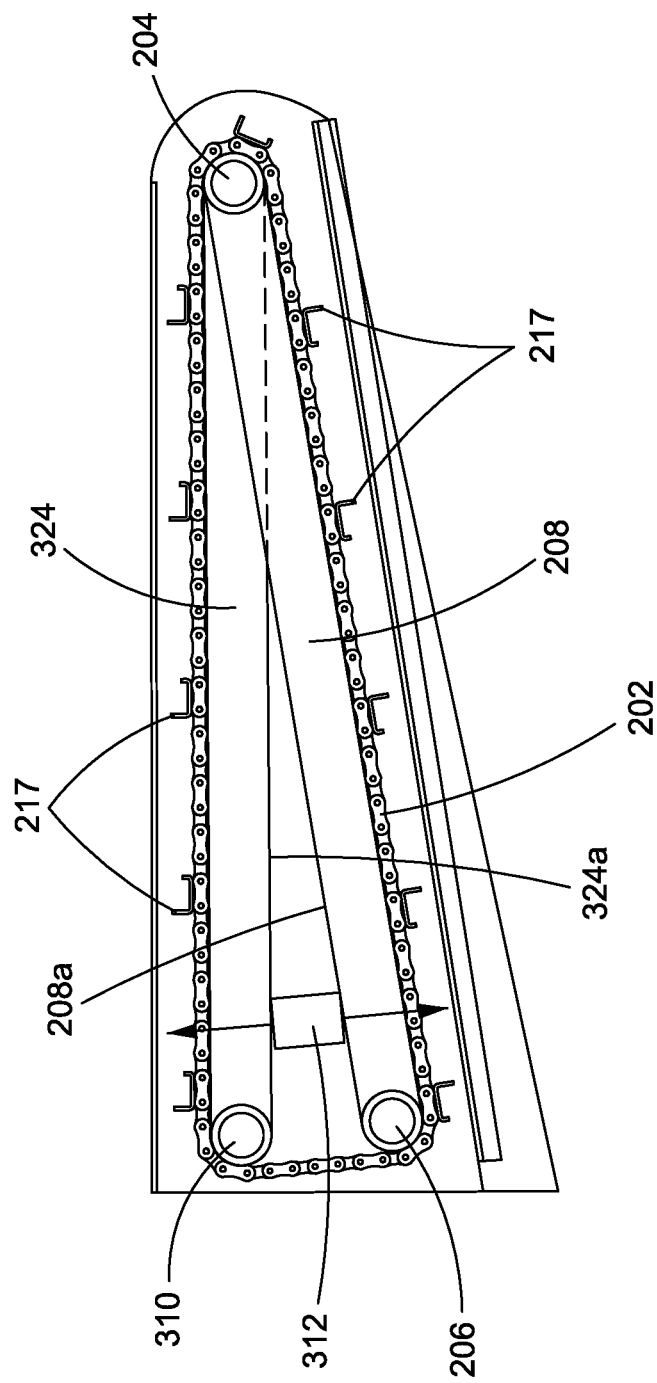
FIG. 3B is a side view of an exemplary feeding system illustrating a force mechanism positioned in-line with an upper support arm and a lower support arm for use with embodiments of the present invention.

In some embodiments, force mechanisms may be positioned in-line with upper and lower support arms or in line with a conveyor roller and a support arm. For example, as shown at FIG. 2B, upper conveyor roller 210 may include an upper conveyor roller coupling portion 210a at an end of the upper conveyor roller 210. The upper conveyor roller coupling portion 210a, such as a bearing for example, may be used to couple the upper conveyor roller 210 to force mechanism 212. In one aspect of the embodiment, the upper conveyor roller coupling portion 210a may also be used to couple the upper conveyor roller 210 to the feeder housing 218. As shown at FIG. 2B, force mechanism 212 (e.g. a spring) may be coupled to a top surface 208a of lower support arm 208 and a bottom surface 210b of the upper conveyor roller coupling portion 210a. In some exemplary embodiments, a conveyor assembly may include more than one force mechanism positioned in-line with a conveyor roller and a support arm. In the embodiment shown at FIG. 3B, first force mechanism 312 (e.g. a spring), may be coupled to a top surface 208a of lower support arm 208 and a bottom surface 324a of the upper support arm 324. Second force mechanism 313 may be coupled to a top surface (not shown) of lower support arm 209 and a bottom surface (not shown) of support arm 325.

Figure 4:
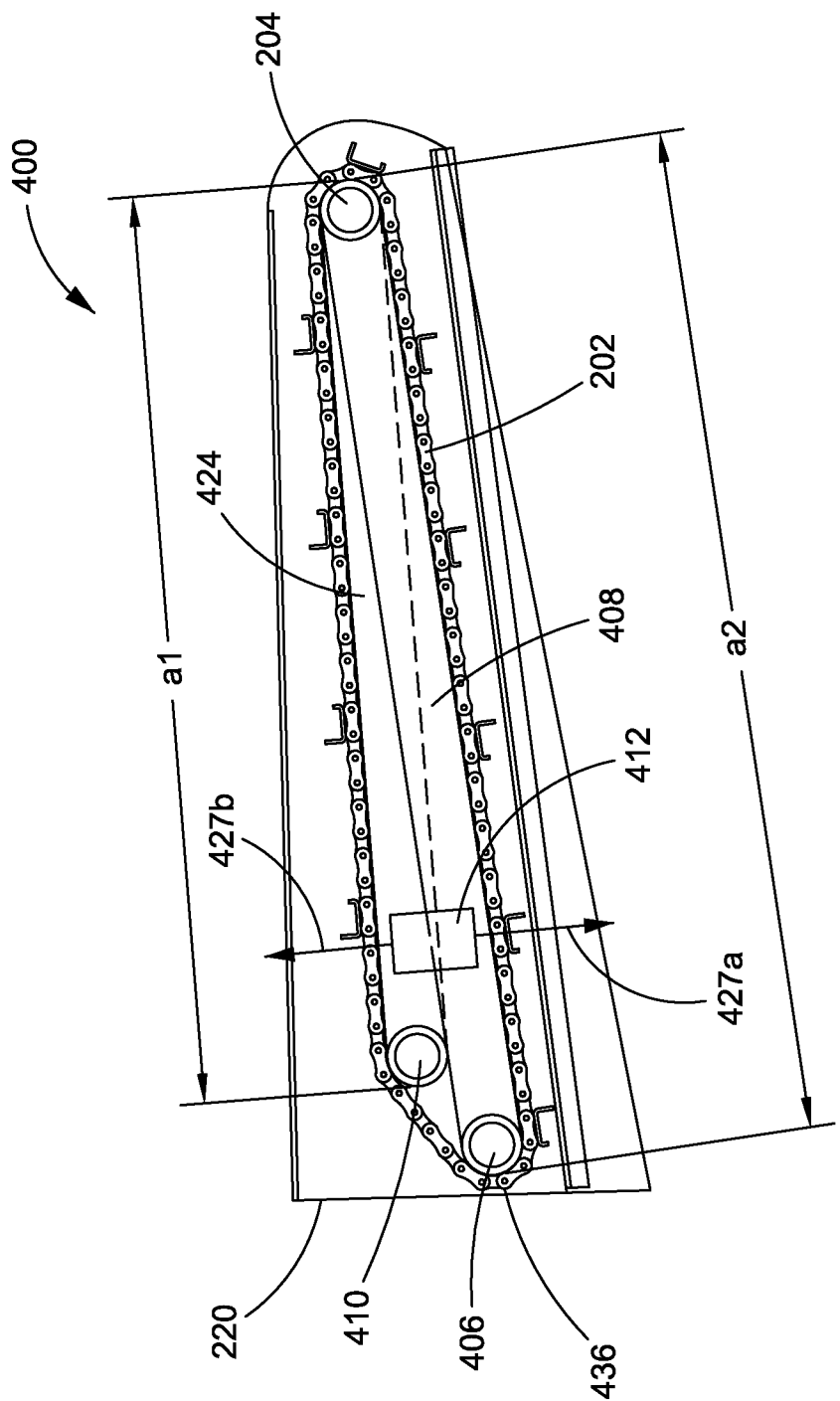
FIG. 4 is a side view of an exemplary feeding system illustrating an upper support arm having a lesser length than a lower support arm for use with embodiments of the present invention.
Figure 4A:
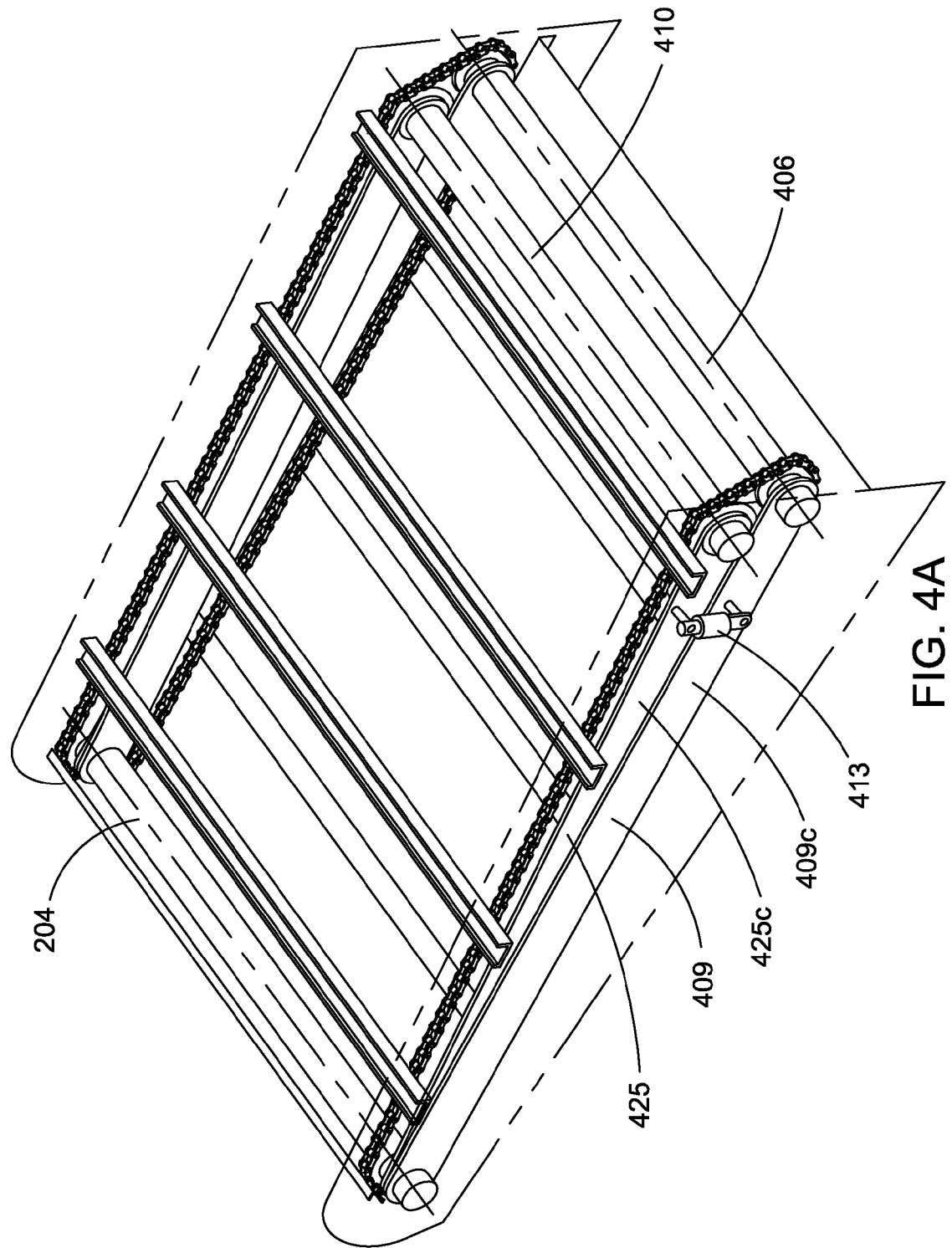
FIG. 4A is a perspective view of an exemplary feeding system illustrating an upper support arm having a lesser length than a lower support arm and a hydraulic cylinder coupled to outer edges of the support arms for use with embodiments of the present invention.
Figure 5:
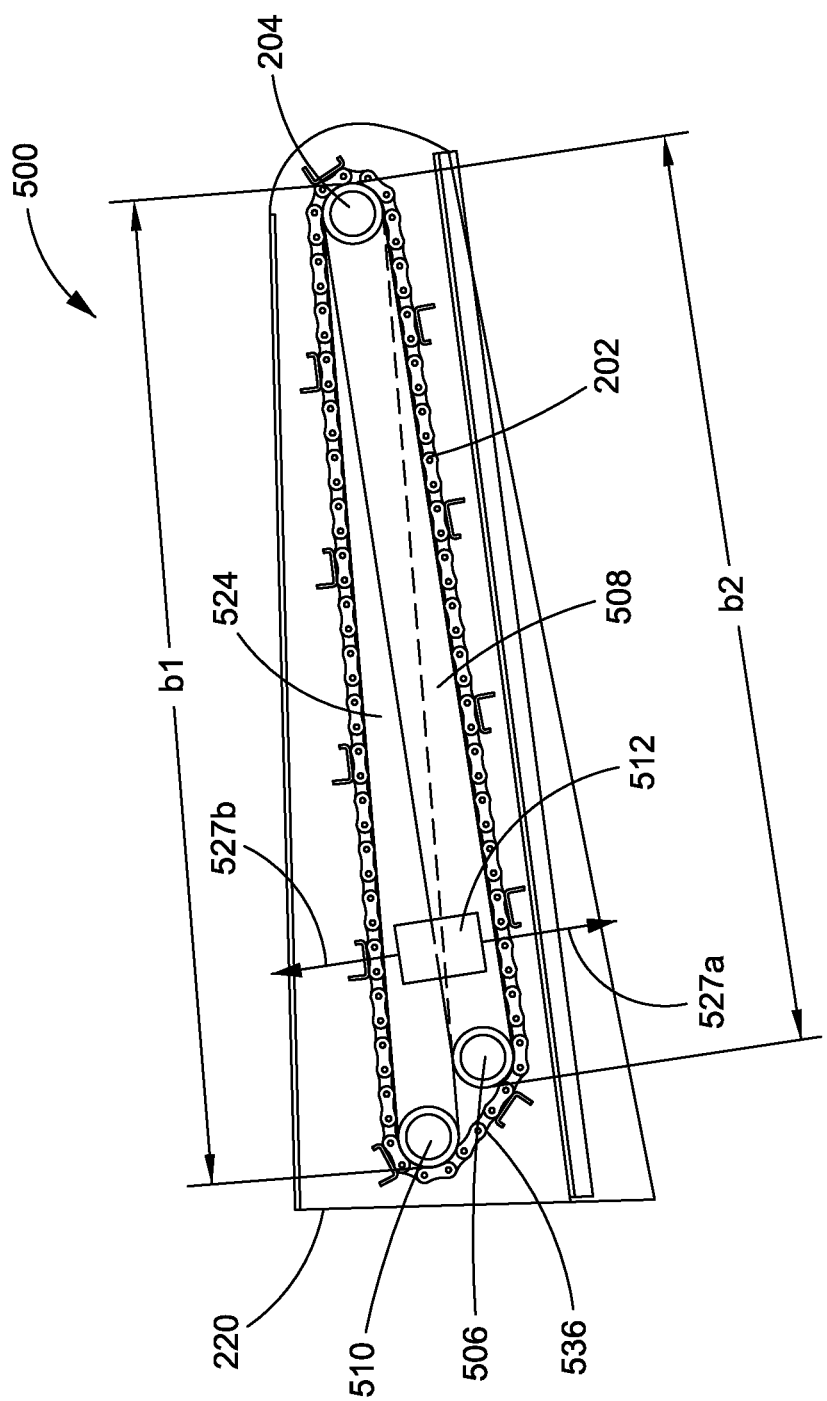
FIG. 5 is a side view of an exemplary feeding system illustrating an upper support arm having a greater length than a lower support arm for use with embodiments of the present invention.

In other embodiments, force mechanisms may be positioned on outer surfaces of upper and lower support arms or outer surfaces of a conveyor roller and a support arm. For example, as shown at FIG. 2 and FIG. 2A, force mechanism 212 (e.g. a hydraulic cylinder) may be coupled to an outer surface 208c of lower support arm 208 and upper conveyor roller coupling portion 210a. Upper conveyor roller 210 may also include another upper conveyor roller coupling portion 210c at another end of the upper conveyor roller 210. Force mechanism 213, shown at 2A, may be coupled to the upper conveyor roller coupling portion 210c and an outer surface (not shown) of lower support arm 209. In another example shown at FIG. 3 and FIG. 3A, force mechanism 312 (e.g. a hydraulic cylinder) may be coupled to an outer surface 208c of lower support arm 208 and an outer surface 324c of upper support arm 324. Force mechanism 313, shown at FIG. 3A, may be coupled to an outer surface (not shown) of lower support arm 209 and an outer surface (not shown) of upper support arm 325. FIG. 4, FIG. 4A and FIG. 5 also illustrate exemplary embodiments having force mechanisms 412, 512 positioned on outer surfaces of upper support arms 424, 425, 524 and lower support arms 408, 508, 509. FIG. 4A illustrating a hydraulic cylinder force mechanism 412 coupled to an outer surface 409c of lower support arm 409 and outer surface of upper support arm 425c for use with embodiments of the present invention The locations of the force mechanisms in the exemplary embodiments illustrated throughout this document are merely exemplary. Other embodiments may include force mechanism in different locations and may be configured to apply forces in substantially opposite directions for tensioning a chain.

In some embodiments of the present invention, at least one upper support arm may be the same length as a corresponding lower support arm. For example, as shown at FIG. 3, feeding system 300 includes an upper support arm 324 extending an upper support arm distance y from the drive shaft 204 to the upper conveyor roller 310. Lower support arm 208 extends from the drive shaft 204 to the lower conveyor roller 206 the same distance as the upper support arm distance x.

In other embodiments of the present invention, at least one upper support arm may be a different length as a corresponding lower support arm. For example, as shown at FIG. 4, feeding system 400 includes a lower support arm 408 extending a lower support arm distance $a_2$ from the drive shaft 204 to the lower conveyor roller 406. Upper support arm 424 extends from the drive shaft 204 to the upper conveyor roller 410 a lesser distance a1 than the upper support arm distance a2. As shown at FIG. 4, an outer surface 436 of the chain 202 at the front end 220 of the feeder system 400 is sloped such that a lesser amount of space may exist between the header auger 328 (shown at FIG. 3) and an outer surface 436 of the chain 202 along the lower support arm 408. Feeding system 400 also includes force mechanism 412 coupled between the upper support arm 424 and the lower support arm 408. Force mechanism 412 may be configured to apply a force to: (i) the lower support arm 408 in a first direction 427a and (ii) the upper support arm 424 in a second direction 427b substantially opposite the first direction 427a. Accordingly, force mechanism 412 may apply the force to chain 402 by applying the force to the lower support arm 408 in the first direction 427a. Force mechanism 412 may also apply the force to chain 402 by applying the force to the upper support arm 424 in the second direction 427b. The force, applied in substantially opposite directions, automatically tensions the chain 402 when the tension decreases.

As shown at FIG. 5, feeding system 500 includes lower support arm 508 extending a lower support arm distance $b_2$ from the drive shaft 204 to the lower conveyor roller 506. Upper support arm 524 extends from the drive shaft 204 to the upper conveyor roller 510 a greater distance b1 than the upper support arm distance b2. As shown at FIG. 5, an outer surface 536 of the chain 202 at the front end 220 of the feeder system 500 is sloped such that a greater amount of space may exist between the header auger 328 (shown at FIG. 3) and an outer surface 536 of the chain 202 along the lower support arm 508, which may provide a more gradual crop transition from the header auger 328 to the feeding system 500. Feeding system 500 also includes force mechanism 512 coupled between the upper support arm 524 and the lower support arm 508. Force mechanism 512 may be configured to apply a force to: (i) the lower support arm 508 in a first direction 527a and (ii) the upper support arm 524 in a second direction 527b substantially opposite the first direction 527a. Accordingly, force mechanism 512 may apply the force to chain 202 by applying the force to the lower support arm 508 in the first direction 527a. Force mechanism 512 may also apply the force to chain 202 by applying the force to the upper support arm 524 in the second direction 527b. The force, applied in substantially opposite directions, automatically tensions the chain 202 when the tension decreases.

Although FIG. 4 and FIG. 5 illustrates one upper support arm 424, 524 and one lower support arm 408, 508, exemplary feeding systems may include any number of upper support arms and any number of lower support arms. Upper support arms may have the same length or different lengths. Lower support arms may also have the same length or different lengths.

Figure 3C:
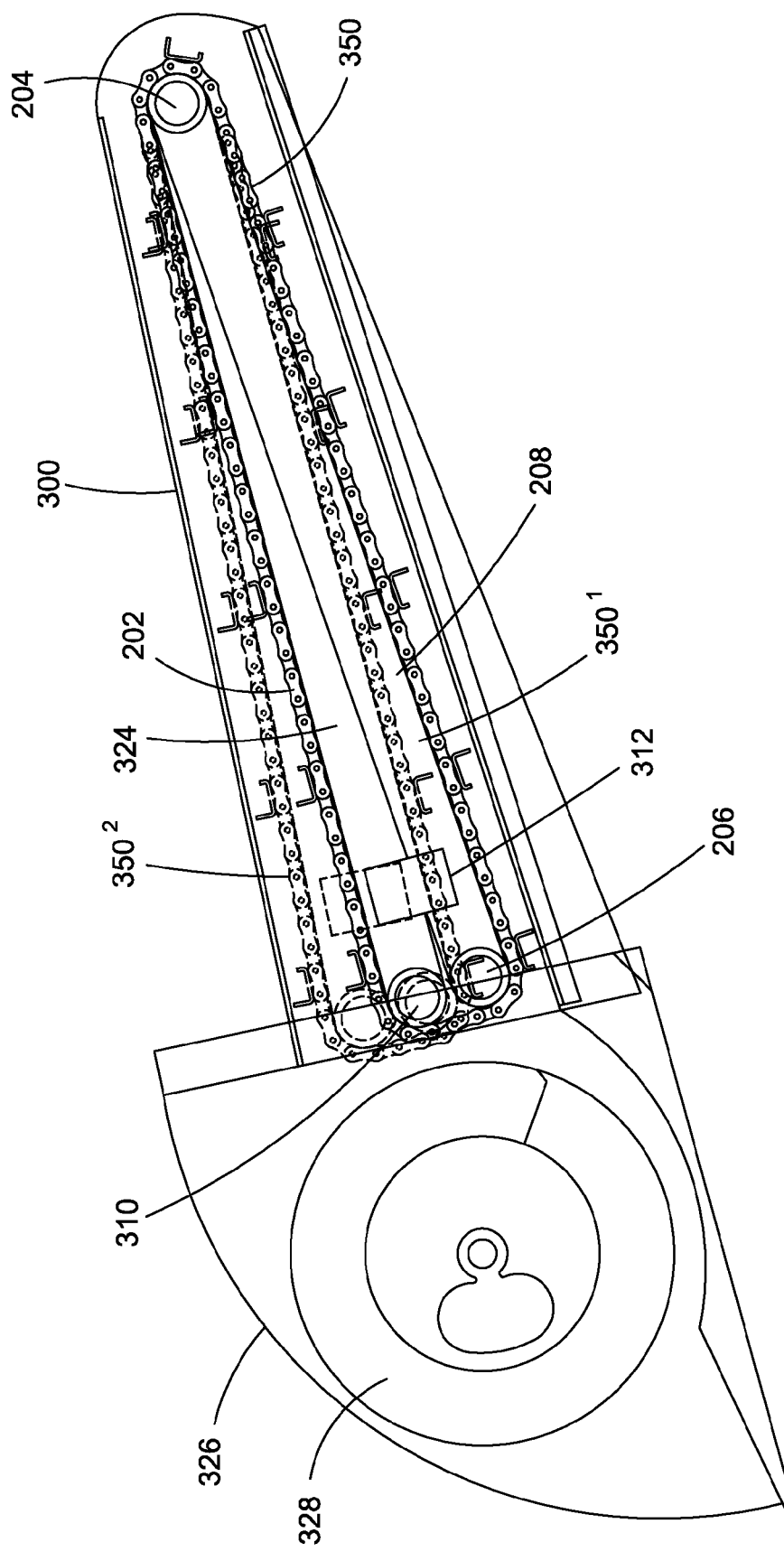
FIG. 3C is a side view of the feeding system shown at FIG. 3 illustrating multiple positions of the conveyor assembly pivoting about the drive shaft axis for use with embodiments of the present invention.

In some embodiments of the present invention, a feeding system may include: (i) a conveyor assembly configured to pivot about the drive shaft axis and (ii) lower and upper support arms configured to independently pivot about the drive shaft axis with respect to each other. For example, FIG. 3C is a side view of the feeding system 300 shown at FIG. 3 illustrating multiple positions of the conveyor assembly 350 pivoting about the drive shaft axis 205 (shown at FIG. 3). As shown at FIG. 3C, a conveyor assembly 350 includes lower conveyor roller 206, upper conveyor roller 310, first lower support arm 208, first upper support arm 324, first chain 350 and first force mechanism 312. FIG. 3C illustrates a unitary movement of the conveyor assembly 350 at a first position $350^1$ and conveyor assembly 350 at a second position $350^2$ as the conveyor assembly 350 pivots about the drive shaft axis 205. Although conveyor assembly 350 may pivot through more than the two positions shown at FIG. 3C two positions are shown for simplicity. Although conveyor assembly 350 shown at FIG. 3C illustrates one lower support arm 208, one upper support arm 324, one chain 202 and one force mechanism 312, exemplary conveyor assemblies which pivot about a drive shaft axis may include any number of lower support arms, upper support arms, chains and force mechanisms.

Figure 3D:
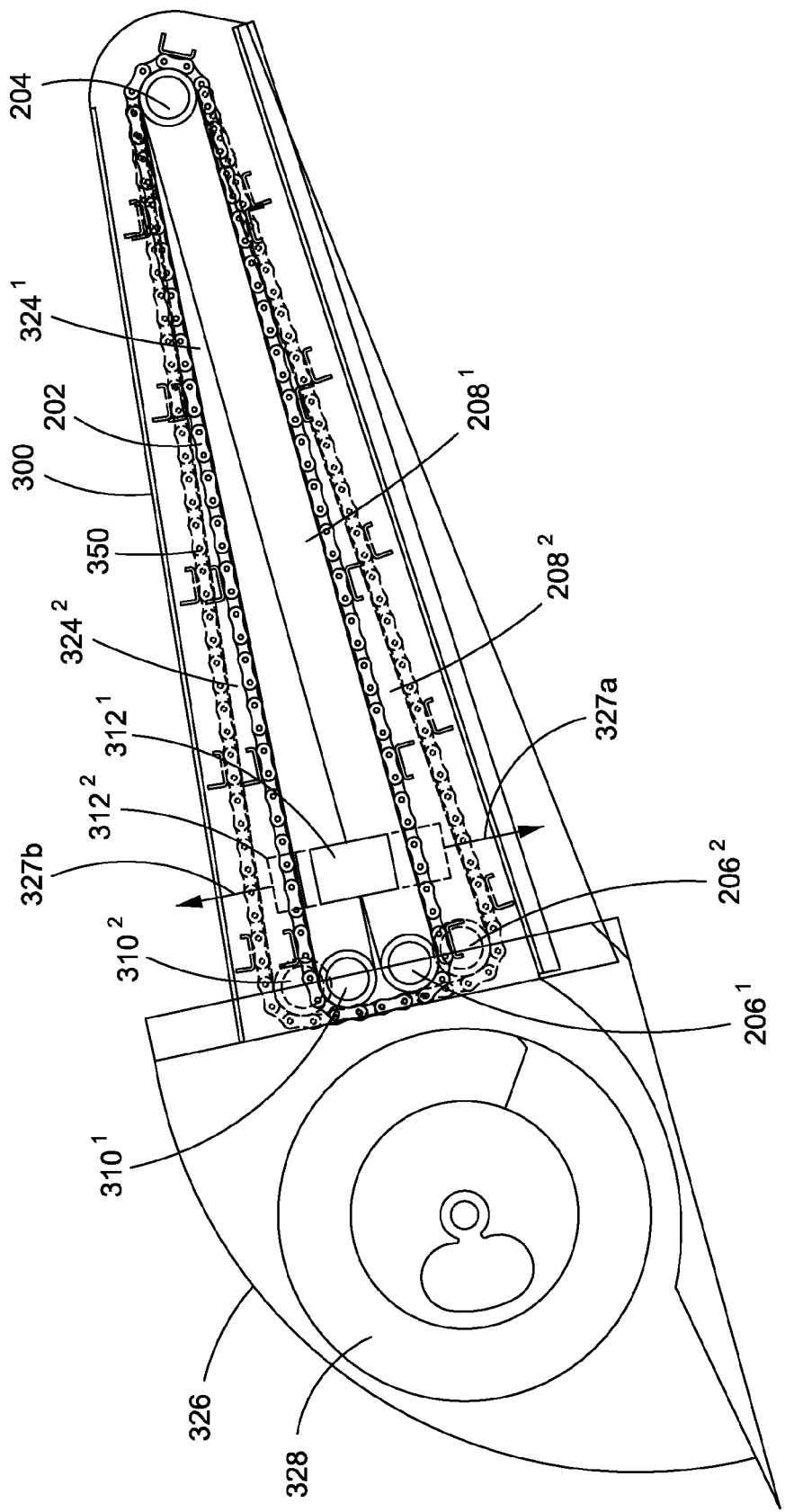
FIG. 3D is a side view of the feeding system shown at FIG. 3 illustrating multiple positions of the lower support arm and upper support arm independently pivoting about the drive shaft axis with respect to each other for use with embodiments of the present invention.

FIG. 3D is a side view of the feeding system 300 shown at FIG. 3 illustrating multiple positions of the lower support arm 208 and upper support arm 324 independently pivoting about the drive shaft axis 205 (see FIG. 3) with respect to each other. As shown at FIG. 3D, lower support arm 208 is configured to independently pivot about the drive shaft axis 204 with respect to upper support arm 324. FIG. 3D illustrates upper conveyor roller 310, upper support arm 324 lower conveyor roller 206 and lower support arm 208, at their respective first positions $310^1$, $324^1$, $206^1$ and $208^1$. FIG. 3D also illustrates upper conveyor roller 310, upper support arm 324, lower conveyor roller 206 and lower support arm 208 having moved to their respective second positions $310^2$, $324^2$, $206^2$ and $208^2$, resulting from force mechanism 312 applying a force to: (i) lower support arm 208 in a first direction 327a and (ii) upper support arm 324 in a second direction 327b substantially opposite the first direction 327a. In some embodiments, however, lower support arm 208 may be configured to remain fixed as upper support arm 324 is moved away from lower support arm 208 in the second direction 327b.

FIG. 3D also illustrates force mechanism 312 in its respective first position $312^1$ and at its respective second position $312^2$, after having expanded in the first direction 227a and second direction 227b, thereby increasing the distance between the lower conveyor roller 206 and the upper conveyor roller 310 and tensioning the chain 202. Although the upper support arm 324 and lower support arm 208 may pivot through more than the two positions shown at FIG. 3D, two positions are shown for simplicity. Although conveyor assembly 350 shown at FIG. 3D illustrates one lower support arm 208, one upper support arm 324, one chain 302 and one force mechanism 312, exemplary conveyor assemblies having upper and lower support arms configured to independently pivot about the drive shaft axis 205 with respect to each other may include any number of lower support arms, upper support arms, chains and force mechanisms.

Figure 6:
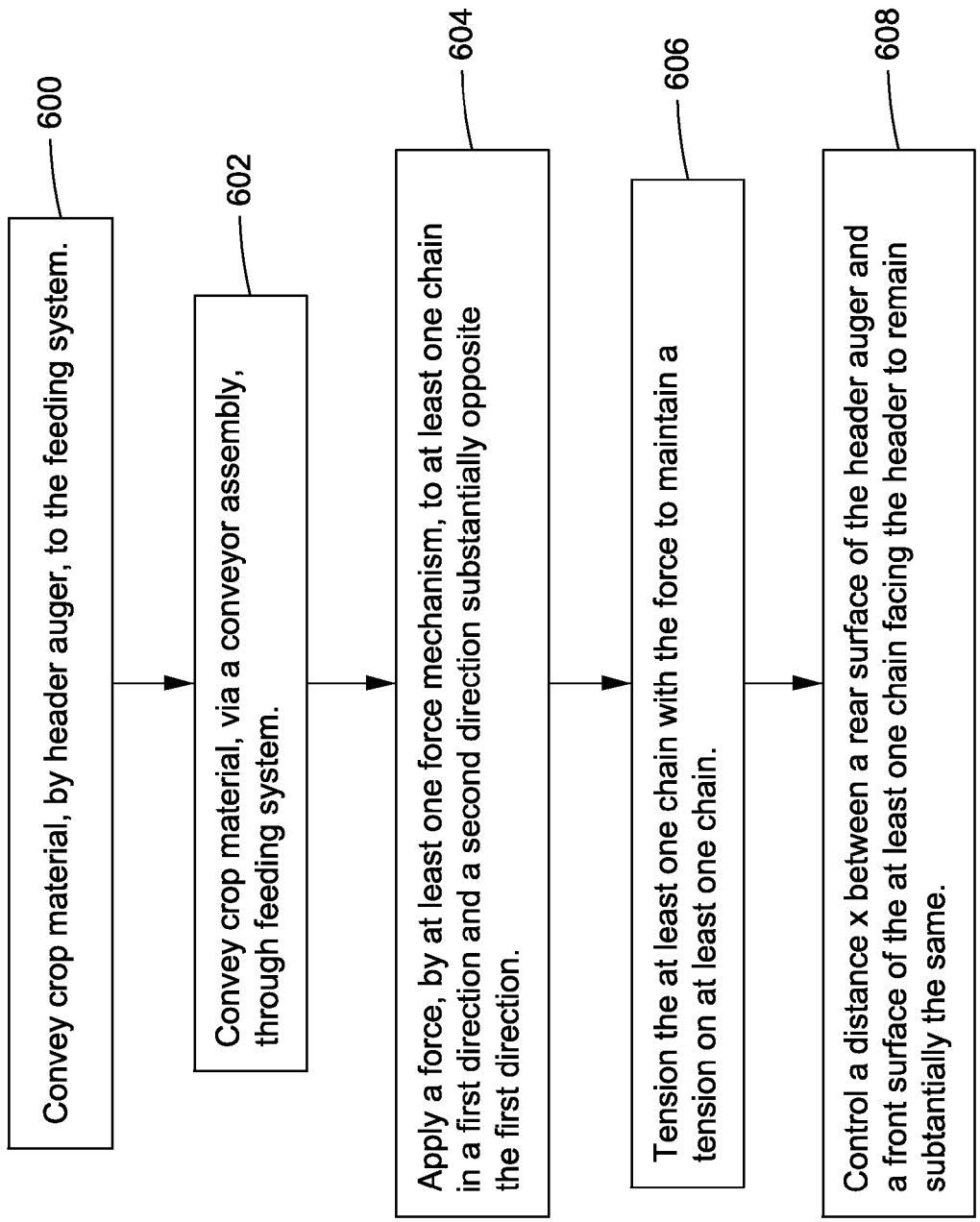
FIG. 6 is a flow chart illustrating an exemplary method for conveying crop material through a combine feeding system in accordance with an embodiment of the invention.

FIG. 6 is a flow chart illustrating an exemplary method for conveying crop material through a combine feeding system 200, 300. At block 600, crop material may be conveyed by a header auger 328 to the feeding system 200, 300. For example, the crop may be conveyed by header auger 328 to the feeding system 300 along the path 330 in a direction shown by arrows 332 at FIG. 3.

At block 602, crop material may be conveyed, via a conveyor assembly 224, 350 through feeding system 200, 300. The crop may be conveyed by driving a drive shaft 204 coupled to a feeder housing 218 and proximate to a rear end 222 of the feeder housing 218 and causing the drive shaft 204 to rotate about a drive shaft axis 202. The crop may also be conveyed by rotating a lower conveyor roller 206 coupled to the feeder housing 218 and proximate to a front end 220 of the feeder housing 218 about a lower conveyor roller axis and rotating an upper conveyor roller 210, 310 spaced from the lower conveyor roller 206 and located above the lower conveyor roller 206 about an upper conveyor roller axis. The crop may also be conveyed by moving at least one chain 202, 203 over the drive shaft 204, the lower conveyor roller 206 and the upper conveyor roller 210, 310, 410, 510 and pivoting at least one lower support arm 208 coupled to the drive shaft 204 and the lower conveyor roller 206 about the drive shaft axis 205.

At block 604, a force may be applied by at least one force mechanism 212, 213, 312, 313, 412, 512 to (i) the at least one chain 202, 203 in a first direction 227a, 327a, 427a, 527a and (ii) the at least one chain 202, 203 in a second direction 227b, 327b, 427b, 527b substantially opposite the first direction. At block 606, the at least one chain may be tensioned with the force when the tension of the at least one chain 202, 203 decreases to maintain a tension on the at least one chain 202, 203. During the life of the feeding system, the at least one chain 202, 203 may lose tension due to wear and tear. When the tension of the at least one chain decreases, however, the force applied in both directions tensions the at least one chain 202, 203, alleviating the need for manual tensioning, improving crop flow and preventing the chain from contacting and damaging other components in the combine.

At block 608, a distance x between a rear surface of the header auger 328 and a front surface 336, 436, 536 of the at least one chain 202, 203 facing the header auger 328 may be controlled to remain substantially the same. For example, when the tension of the at least one chain 202, 203 decreases, the at least one force mechanism 212, 213, 312, 313, 412, 512 may move the lower conveyor roller 206 further away from the upper conveyor roller 210, 310 in directions substantially perpendicular to the rear surface 336, 436, 536 of the header auger 328 facing the at least one chain 202, 203 and tensioning the at least one chain 202, 203, thereby controlling the distance x to remain substantially the same and preventing the at least one chain 202, 203 from contacting the header auger 328.

The feeding system 200, 300 may also include at least one upper support arm 324, 424, 524 coupled to the drive shaft 204 and the upper conveyor roller 310, 410, 510 and configured to pivot about the drive shaft axis 205. The at least one force mechanism 312, 313, 412, 512 may apply a force to (i) the at least one lower support arm 208, 209, 408, 508 in a first direction 327a, 427a, 527a and (ii) the at least one upper support arm 324, 325, 424, 524 in a second direction 327b, 427b, 527b substantially opposite the first direction, thereby tensioning the at least one chain 202, 203.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A combine feeding system that maintains a constant clearance between a header auger and a feeder comprising:
    a feeder housing comprising (i) a first housing wall extending from a front end of the feeder housing to a rear end of the feeder housing and (ii) a second housing wall extending from the front end of the feeder housing to the rear end of the feeder housing, the second housing wall being spaced away from and substantially parallel to the first housing wall;
    a drive shaft coupled to at least one of the first housing wall and the second housing wall, extending lengthwise between the first housing wall and the second housing wall proximate to a rear end of the feeder housing and configured to rotate around a drive shaft axis substantially perpendicular to the first housing wall and the second housing wall;
    a lower conveyor roller proximate to the front end of the feeder housing, coupled to at least one of the first housing wall and the second housing wall, extending lengthwise between the first housing wall and the second housing wall and configured to rotate around a lower conveyor roller axis substantially perpendicular to the first housing wall and the second wall;
    an upper conveyor roller located proximate to the front end of the feeder housing, coupled to at least one of the first housing wall and the second housing wall, spaced from the lower conveyor roller, extending lengthwise between the first housing wall and the second housing wall and configured to rotate around an upper conveyor roller axis substantially perpendicular to the first housing wall and the second housing wall;
    at least one chain configured to move over the drive shaft, the lower conveyor roller and the upper conveyor roller;
    at least one lower support arm coupled to the drive shaft and the lower conveyor roller and configured to pivot about the drive shaft axis; the at least one lower support arm pivots around the shaft axis to regulate a tension in the at least one chain without reducing a predetermined distance between an auger associated with the feeder housing and a front surface of the at least one chain.

2. The combine feeding system of claim 1, further comprising at least one upper support arm coupled to the drive shaft and the upper conveyor roller and configured to pivot about the drive shaft axis,
    wherein the at least one force mechanism is coupled to at least one of (i) an outer surface of the at least one upper conveyor roller and another outer surface of the at least one lower support arm; and (ii) an outer surface of the at least one upper support arm and an outer surface of the at least one lower support arm.

3. The combine feeding system of claim 2, wherein
    the at least one lower support arm comprises:
        a first lower support arm proximate to the first housing wall, and
        a second lower support arm proximate to the second housing wall and spaced lengthwise from the first lower support arm;
    the at least one upper support arm comprises:
        a first upper support arm proximate to the first housing wall, and
        a second upper support arm proximate to the second housing wall and spaced lengthwise from the first upper support arm;
    the at least one chain comprises:
        a first chain proximate to the first housing wall and configured to move over the drive shaft, the lower conveyor roller and the upper conveyor roller, and
        a second chain proximate to the second housing wall, spaced lengthwise from the first chain and configured to move over the drive shaft, the lower conveyor roller and the upper conveyor roller; and
    the at least one force mechanism comprises:
        a first force mechanism configured to apply a first force to (i) the first chain and the first lower support arm in the first direction and (ii) the first chain and the first upper support arm in the second direction substantially opposite the first direction,
        a second force mechanism configured to apply a second force to (i) the second chain and the second lower support arm in the first direction and (ii) the second chain and the second upper support arm in the second direction substantially opposite the first direction.

4. The combine feeding system of claim 2, wherein
    the lower conveyor roller, the upper conveyor roller, the at least one lower support arm and the at least one upper support arm together comprise a conveyor assembly which is configured to pivot about the about the drive shaft axis; and
    the at least one upper support arm is configured to independently pivot about the drive shaft axis with respect to the at least one lower support arm.

5. The combine feeding system of claim 2, wherein when the tension of the at least one chain decreases, the at least one force mechanism is further configured to: (i) move the lower conveyor roller and the upper conveyor roller away from each other; and (ii) control a distance between an outer surface of a header auger and an outer surface of the at least one chain facing the header auger to remain substantially the same.

6. The combine feeding system of claim 2, wherein
    the at least one upper support arm extends an upper support arm distance from the drive shaft to the upper conveyor roller; and
    the at least one lower support arm extends a lower support arm distance from the drive shaft to the lower conveyor roller, wherein the upper support arm distance and the lower support arm distance are the same.

7. The combine feeding system of claim 2, wherein,
the at least one lower support arm extends a lower support arm distance from the drive shaft to the lower conveyor roller; and
the at least one upper support arm extends an upper support arm distance from the drive shaft to the upper conveyor roller, wherein the upper support arm distance is less than the lower support arm distance.

8. The combine feeding system of claim 2, wherein
the at least one lower support arm extends a lower support arm distance from the drive shaft to the lower conveyor roller; and
the at least one upper support arm extends an upper support arm distance from the drive shaft to the upper conveyor roller, wherein the upper support arm distance is greater than the lower support arm distance.

9. A method of maintaining a constant clearance between a header auger and a feeder when conveying crop material through a combine feeding system comprising:
conveying crop material, via a conveyor assembly, through a feeding system by:
driving a drive shaft coupled to a feeder housing and proximate to a rear end of the feeder housing,
causing the drive shaft to rotate about a drive shaft axis,
rotating a lower conveyor roller coupled to the feeder housing and proximate to a front end of the feeder housing about a lower conveyor roller axis,
rotating an upper conveyor roller spaced from the lower conveyor roller and located above the lower conveyor roller about an upper conveyor roller axis;
moving at least one chain over the drive shaft, the lower conveyor roller and the upper conveyor roller; and
pivoting at least one lower support arm coupled to the drive shaft and the lower conveyor roller about the drive shaft axis;
applying a force, by a force mechanism, to the at least one chain, in both a first direction and in a second direction that is substantially opposite the first direction; and
regulating a tension in the at least one chain without reducing a predetermined distance between an auger associated with the feeder housing and a front surface of the at least one chain.

10. The method of claim 9, further comprising:
conveying the crop material, by a header auger, to the feeding system, and
controlling a distance between a rear surface of the header auger and a front surface of the at least one chain facing the header auger to remain substantially the same.

11. The method of claim 9, further comprising
pivoting at least one upper support arm coupled to the drive shaft and the upper conveyor roller about the drive shaft axis; and
applying a force comprises applying the force to (i) the at least one lower support arm in a first direction and (ii) the at least one upper support arm in a second direction substantially opposite the first direction.

12. The method of claim 9, wherein applying a force comprises moving the lower conveyor roller further away from the upper conveyor roller when a tension of the chain decreases.

* * * * *